United States Patent
Vasudevan et al.

(10) Patent No.: US 10,292,205 B2
(45) Date of Patent: May 14, 2019

(54) INTEGRATION OF CELLULAR AND WLAN SYSTEMS

(71) Applicant: Alcatel Lucent, Boulogne Billancourt (FR)

(72) Inventors: Subramanian Vasudevan, Murray Hill, NJ (US); Satish Kanugovi, Bangalore (IN)

(73) Assignee: ALCATEL LUCENT, Nozay (FR)

( * ) Notice: Subject to any disclaimer, the term of this patent is extended or adjusted under 35 U.S.C. 154(b) by 0 days.

(21) Appl. No.: 15/030,189

(22) PCT Filed: Oct. 17, 2014

(86) PCT No.: PCT/EP2014/072344
§ 371 (c)(1),
(2) Date: Apr. 18, 2016

(87) PCT Pub. No.: WO2015/059055
PCT Pub. Date: Apr. 30, 2015

(65) Prior Publication Data
US 2016/0242235 A1 Aug. 18, 2016

(30) Foreign Application Priority Data
Oct. 22, 2013 (IN) .......................... 3135/DEL/2013

(51) Int. Cl.
*H04W 88/06* (2009.01)
*H04W 72/12* (2009.01)
(Continued)

(52) U.S. Cl.
CPC ............. *H04W 88/06* (2013.01); *H04L 69/14* (2013.01); *H04L 69/324* (2013.01);
(Continued)

(58) Field of Classification Search
CPC . H04W 88/06; H04W 88/08; H04W 72/0413; H04W 72/1242; H04W 76/026; H04W 84/12; H04L 69/14; H04L 69/324
See application file for complete search history.

(56) References Cited

U.S. PATENT DOCUMENTS 7,512,094 B1 * 3/2009 Linebarger ............ H04W 48/18
                                                                                      370/329
9,750,078 B2 * 8/2017 Bergek ................ H04W 84/005
(Continued)

FOREIGN PATENT DOCUMENTS

CN        102448150 A     5/2012
JP        2011-166251 A     8/2011
(Continued)

OTHER PUBLICATIONS

International Search Report for PCT/EP2014/072344 dated Jul. 10, 2015.
(Continued)

*Primary Examiner* — Shailendra Kumar
(74) *Attorney, Agent, or Firm* — Fay Sharpe LLP (57) ABSTRACT

A cellular-WLAN integration capability is presented herein. The cellular-WLAN integration capability provides an integration of a cellular network and a WLAN network that supports more efficient routing of downlink and uplink bearer traffic via cooperation of the cellular and WiFi interfaces in both the radio access network and at the end user device. The cellular-WLAN integration capability provides an integration of a cellular network and a WLAN network in which downlink bearer transmissions to an end user device may be selectively distributed between the cellular and WLAN networks and, similarly, uplink bearer transmissions from an end user device may be selectively distributed between the cellular and WLAN networks. The cellular-WLAN integration capability provides an integra-
(Continued)

tion of a cellular network and a WiFi network that tends to increase capacity for downlink bearer traffic while providing a reliable and efficient path for uplink bearer traffic.

9 Claims, 8 Drawing Sheets

(51) Int. Cl.
*H04W 72/04* (2009.01)
*H04L 29/08* (2006.01)
*H04W 88/08* (2009.01)
*H04W 76/16* (2018.01)
*H04L 29/06* (2006.01)
*H04W 84/12* (2009.01)

(52) U.S. Cl.
CPC ... *H04W 72/0413* (2013.01); *H04W 72/1242* (2013.01); *H04W 76/16* (2018.02); *H04W 88/08* (2013.01); *H04W 84/12* (2013.01)

(56) References Cited

U.S. PATENT DOCUMENTS

| | | | |
|---|---|---|---|
| 2013/0201884 A1* | 8/2013 | Freda | H04W 72/005 370/278 |
| 2013/0242843 A1 | 9/2013 | Kojima | |
| 2014/0105007 A1* | 4/2014 | Pathmasuntharam | H04L 12/2856 370/230 |
| 2015/0181491 A1* | 6/2015 | Van Phan | H04W 28/08 370/331 |

FOREIGN PATENT DOCUMENTS

| | | |
|---|---|---|
| JP | 2013-520096 A | 5/2013 |
| JP | 2013-197762 A | 9/2013 |
| JP | 2013-197820 A | 9/2013 |
| KR | 10-2004-0097104 A | 11/2004 |
| WO | 2012/109195 A2 | 8/2012 |
| WO | WO 2012/174213 A1 | 12/2012 |
| WO | WO 2013/041947 A1 * | 3/2013 |
| WO | 2013/112983 A1 | 8/2013 |
| WO | 2013/138708 A1 | 9/2013 |
| WO | 2013/144714 A2 | 10/2013 |

OTHER PUBLICATIONS

Intel Corporation, "Discussions on Carrier Aggregation across LTE and WIFI", 3GPP TSG-RAN Meeting #53, RP-111094, Sep. 16, 2011, 4 pages.

* cited by examiner

INTEGRATION OF CELLULAR AND WLAN SYSTEMS

TECHNICAL FIELD

The disclosure relates generally to communication networks and, more specifically but not exclusively, to integration of cellular networks and wireless local area networks (WLANs).

BACKGROUND

In general, cellular systems using licensed spectrum (e.g., Long Term Evolution (LTE) systems) and wireless local area networks (WLANs) using unlicensed bands of spectrum (e.g., Wireless Fidelity (WiFi) access or other local access) are used for providing wireless services in a complementary manner. The cellular systems generally provide macro cellular coverage outdoors and with some in-building reach, whereas the wireless area networks generally serve enterprises, residences, public venues, and the like. Additionally, the overlap between coverage areas of the cellular systems and WLANs is expected to increase over time. For example, at least some cellular networks, such as LTE networks, are evolving further with the addition of LTE pico cells, which are being deployed in an attempt to provide ubiquitous outdoor and indoor coverage. Additionally, for example, in order to take advantage of the large amounts of unlicensed spectrum allocated at 2.4 GHz and 5 GHz, LTE pico cells may be capacity augmented via embedding of WiFi access points within the LTE pico cells. This will further expand the overlap between the coverage areas of the cellular systems and WLANs.

SUMMARY OF EMBODIMENTS

Various deficiencies in the prior art are addressed by embodiments for integration of a cellular network and a wireless local area network (WLAN).

In at least some embodiments, a user device includes an interface configured for communication via a cellular link, an interface configured for communication via a contention-based wireless link, and a processor. The processor is configured to receive downlink bearer traffic via at least one of the interface configured for communication via the cellular link or the interface configured for communication via the contention-based wireless link. The processor also is configured to selectively distribute uplink bearer traffic between the interface configured for communication via the cellular link and the interface configured for communication via the contention-based wireless link.

In at least some embodiments, a cellular network access point includes an interface configured for cellular communication via a cellular link, an interface configured for communication with a wireless local area network (WLAN) access point (WAP), and a processor. The processor is configured to receive downlink bearer traffic intended for delivery to an end user device and selectively distribute the downlink bearer traffic between the interface configured for cellular communication via the cellular link and the interface configured for communication with the WAP. The processor also is configured to receive uplink bearer traffic from the end user device via at least one of the interface configured for cellular communication via the cellular link and the interface configured for communication with the WAP.

In at least some embodiments, a wireless local area network (WLAN) access point (WAP) includes an interface configured for communication with a cellular network access point, an interface configured for wireless communication with end user devices via a contention-based wireless link, and a processor. The processor is configured to receive, from the cellular network access point via the interface configured for communication with the cellular network access point, downlink bearer traffic intended for one or more of the end user devices, and transmit the downlink bearer traffic toward the one or more end user devices via the interface configured for wireless communication with end user devices via the contention-based wireless link.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

A cellular-WLAN integration capability is presented herein. The cellular-WLAN integration capability provides an integration of a cellular network and a WLAN network that supports more efficient routing of downlink and uplink bearer traffic via cooperation of the cellular and WiFi interfaces in both the radio access network and at the end user device. The cellular-WLAN integration capability provides an integration of a cellular network and a WLAN network in which downlink bearer transmissions to an end user device may be selectively distributed between the cellular and WLAN networks and, similarly, uplink bearer transmissions from an end user device may be selectively distributed between the cellular and WLAN networks. The cellular-WLAN integration capability provides an integration of a cellular network and a WiFi network that tends to increase (and, in at least some cases, maximize) capacity for downlink bearer traffic while providing a reliable and efficient path for uplink bearer traffic. In at least some embodiments, the cellular-WLAN integration capability may increase the downlink capacity of a WLAN network by a factor of two or more for typical numbers of active users on the WLAN network. Thus, various embodiments of the cellular-WLAN integration capability provide increased throughput for end users, improved quality-of-experience for end users, and the like. These and various other embodiments and advantages of the cellular-WLAN integration capability may be better understood by way of reference to the exemplary communication system of FIG. 1.

Figure 1:
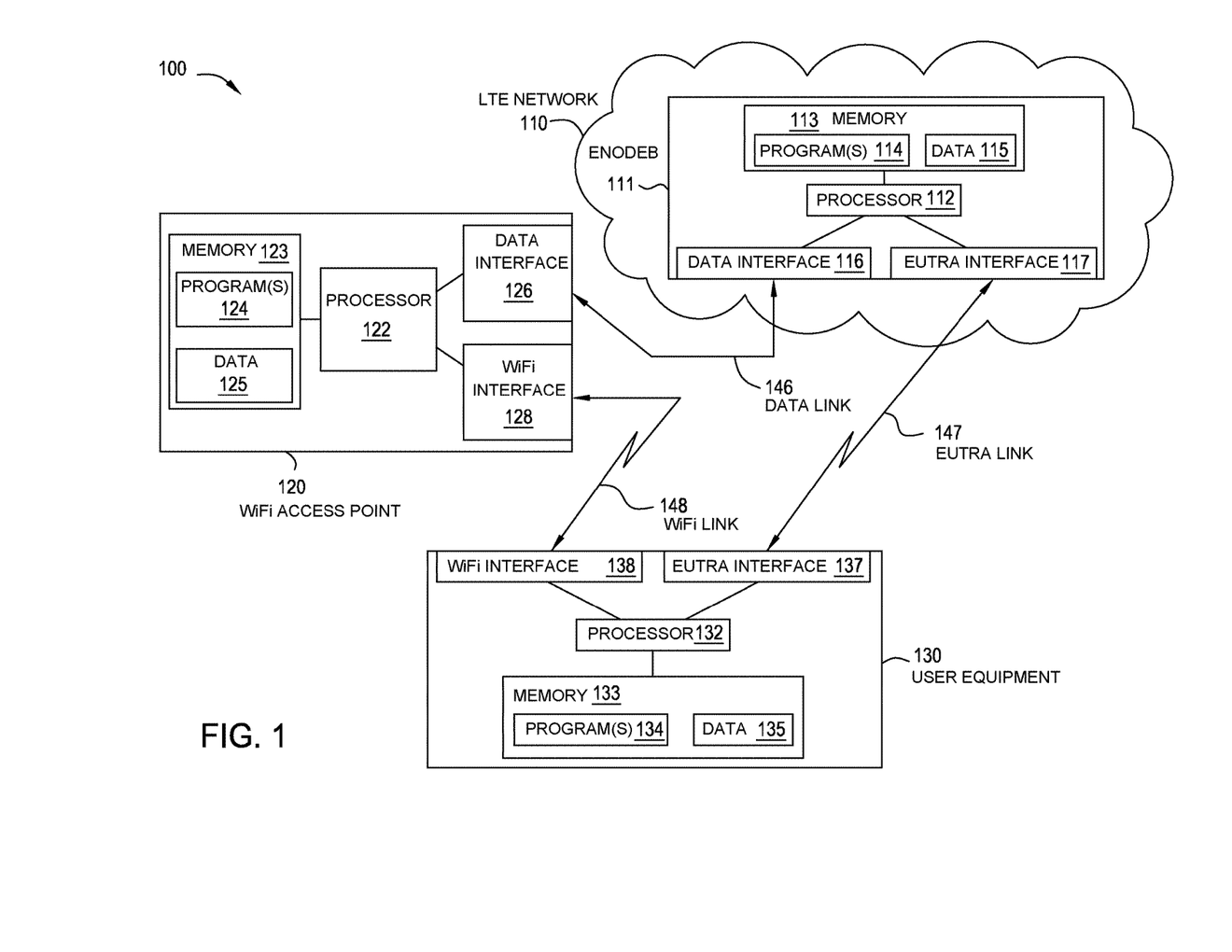
FIG. 1 depicts an exemplary communication system illustrating integration of a cellular network and a wireless local area network.

FIG. 1 depicts an exemplary communication system illustrating integration of a cellular network and a wireless local area network.

The communication system 100 includes a Long Term Evolution (LTE) network 110, a WiFi Access Point (WAP) 120, and a User Equipment (UE) 130.

The LTE network 110 includes an eNodeB 111. The LTE network 110, including the air interface of eNodeB 111, supports the evolved UMTS Terrestrial Radio Access (EUTRA) radio access network standard. It will be appreciated that the LTE network 110 may include a Radio Access Network (RAN) portion (of which eNodeB 111 is a part) and a Core Network (CN) portion. The LTE network 110 may include various other elements which have been omitted for purposes of clarity (e.g., Serving Gateways (SGWs), Packet Data Network (PDN) Gateways (PGWs), Mobility Management Entities (MMES), and the like). The typical configuration and operation of an LTE network will be understood by one skilled in the art.

The eNodeB 111 is configured to support one or more embodiments of the cellular-WLAN integration capability. The eNodeB 111 includes a processor 112, a memory 113, a data interface 116, and an EUTRA interface 117. The processor 112 is communicatively connected to each of memory 113, data interface 116, and EUTRA interface 117. The memory 113 stores programs 114 which may be executed by processor 112 to provide various functions of the cellular-WLAN integration capability discussed herein. The memory 113 also stores data 115 which may be used to provide or generated as a result of execution of various functions of the cellular-WLAN integration capability discussed herein. It will be appreciated that the implementation of eNodeB 111 depicted in FIG. 1 is merely exemplary, and that eNodeB 111 may be implemented in any other manner suitable for providing functions of the cellular-WLAN integration capability.

The WAP 120 is configured to support various embodiments of the cellular-WLAN integration capability. The WAP 120 includes a processor 122, a memory 123, a data interface 126, and WiFi interface 128. The processor 122 is communicatively connected to each of memory 123, data interface 126, and WiFi interface 128. The memory 123 stores programs 124 which may be executed by processor 122 to provide various functions of the cellular-WLAN integration capability discussed herein. The memory 123 also stores data 125 which may be used to provide or generated as a result of execution of various functions of the cellular-WLAN integration capability discussed herein. It will be appreciated that the implementation of WAP 120 depicted in FIG. 1 is merely exemplary, and that WAP 120 may be implemented in any other manner suitable for providing functions of the cellular-WLAN integration capability.

The UE 130 is a user device configured to support EUTRA-based communications and WiFi-based communications. For example, the UE 130 may be a smartphone, a tablet computer, a laptop, or the like. The UE 130 is configured to support various embodiments of the cellular-WLAN integration capability. The UE 130 includes a processor 132, a memory 133, an EUTRA interface 137, and WiFi interface 138. The processor 132 is communicatively connected to each of memory 133, EUTRA interface 137, and WiFi interface 138. The memory 133 stores programs 134 which may be executed by processor 132 to provide various functions of the cellular-WLAN integration capability discussed herein. The memory 133 also stores data 135 which may be used to provide or generated as a result of execution of various functions of the cellular-WLAN integration capability discussed herein. It will be appreciated that the implementation of UE 130 depicted in FIG. 1 is merely exemplary, and that UE 130 may be implemented in any other manner suitable for providing functions of the cellular-WLAN integration capability.

The eNodeB 111, WAP 120, and UE 130 communicate via various communication links.

The eNodeB 111 and UE 130 are configured to communicate via an EUTRA link 147 between EUTRA interface 117 of eNodeB 111 and EUTRA interface 137 of UE 130. The EUTRA link 147 may be a wideband radio frequency implementation using Orthogonal Frequency Division Multiple Access (OFDMA) and Single Carrier Frequency Division Multiple Access (SCFDMA) in the downlink and uplink directions, respectively. It will be appreciated that LTE systems and, thus, EUTRA link 147, are based on either Frequency Division Duplexing or Time Division Duplexing. It will be further appreciated that LTE systems and, thus, EUTRA link 147, are based on scheduled access for user data such that EUTRA link 147 will be understood to be a scheduled, contentionless link (namely, all downlink and uplink user plane transmissions for UE 130 via EUTRA link 147 are scheduled by eNodeB 111). The eNodeB 111 may be configured to communicate via EUTRA link 147 using existing procedures for use by an eNodeB to communicate via a EUTRA air interface. Similarly, UE 130 may be configured to communicate via EUTRA link 147 using existing procedures for use by a UE in communicating via an EUTRA air interface. It will be appreciated that the EUTRA link 147 may include a forward link portion for downstream transmissions from eNodeB 111 toward UE 130 and a reverse link portion for upstream transmissions from UE 130 toward eNodeB 111, each of which has respective resources allocated thereto. The use of EUTRA link 147 to support embodiments of the cellular-WLAN integration capability is described in additional detail below.

The eNodeB 111 and WAP 120 are configured to communicate via a data link 146 that is established between data interface 116 of eNodeB 111 and data interface 126 of WAP 120. The data link 146 may traverse any type of communication network suitable for support bidirectional communication of bearer traffic and control information between an eNodeB and a WAP (e.g., an IP-based network, an Ethernet network, or the like, as well as various combinations thereof). The use of data link 146 to support embodiments of the cellular-WLAN integration capability is described in additional detail below.

The WAP 120 and UE 130 are configured to communicate via a WiFi link 148 between WiFi interface 128 of WAP 120 and WiFi interface 138 of UE 130. The WiFi link 148 represents a WiFi air interface (which may include any of the revisions of the 802.11 family of specifications, including the OFDM based b/g/n revisions and their evolution). The WiFi link 148 is a time-shared channel using a polite access protocol (e.g., Carrier Sense Multiple Access (CSMA)). According to the CSMA mechanism, each potential transmitter (which includes the access point and the stations) vies for use of the channel (for both downlink and uplink transmissions) and defers transmission until the channel is deemed to be clear. The WAP 120 may be configured to communicate via WiFi link 148 using existing procedures for use by a WiFi access point to communicate using a WiFi channel. The UE 130 may be configured to communicate via WiFi link 148 using existing procedures for use by a UE in communicating via a WiFi air interface (e.g., using existing procedures defined by the IEEE 802.11 specification in order to associate with WAP 120, contend for and acquire the WiFi channel using a CSMA mechanism considering the Distributed Coordination Function (DCF) Inter-Frame Space (DIFS) and Contention Window (CW) parameters, acknowledge receipt of data via the WiFi channel to WAP 120 considering the Short Inter-Frame Space (SIFS) parameter, or the like). Thus, WiFi link 148 will be understood to be a contention-based link. The use of WiFi link 148 to support embodiments of the cellular-WLAN integration capability is described in additional detail below.

The communication system 100 is configured to support delivery of downlink bearer traffic from eNodeB 110 to UE 130 and delivery of uplink bearer traffic from UE 130 to eNodeB 110. For example, the downlink bearer traffic may include a webpage, a video, an email, one direction of a voice-over-IP (VOIP) call, one direction of a video telephony call, or the like. For example, the uplink bearer traffic may include a request for a webpage, a request for a video, an email, one direction of a VOIP call, one direction of a video telephony call, upload of a video, or the like. The transmission of downlink and uplink bearer traffic within communication system 100 is described in additional detail below.

For downlink bearer traffic from eNodeB 111 that is intended for delivery to UE 130, both eNodeB 111 and UE 130 are configured to support delivery of the downlink bearer traffic via EUTRA link 147 and WiFi link 148.

The eNodeB 111 may be configured to selectively split the downlink bearer traffic intended for UE 130 between EUTRA link 147 and WiFi link 148. The selective splitting of downlink bearer traffic between EUTRA link 147 and WiFi link 148 includes selectively splitting downlink bearer traffic between transmission via EUTRA interface 117 (and, thus, EUTRA link 147) and transmission via data interface 116 (which is routed to WAP 120 for delivery to UE 130 via WiFi link 148). The eNodeB 111 may split the downlink bearer traffic on a per-flow basis (e.g., splitting traffic of a given application flow such that a first portion of the packets of the packet flow are sent via EUTRA link 147 and a second portion of the packets of the packet flow are sent via WiFi link 148), independent of flow (e.g., a first portion of the traffic intended for UE 130 is sent via EUTRA link 147 and a second portion of the traffic intended for UE 130 is sent via WiFi link 148), or the like. The eNodeB 111 may split the downlink bearer traffic between EUTRA link 147 and WiFi link 148 based on a traffic splitting ratio for UE 130 (which may be specific to the UE 130 or used for some or all UEs being served by eNodeB 111). The traffic splitting ratio may be set such that all downlink bearer traffic is transmitted via EUTRA link 147, respective portions of downlink bearer traffic are distributed across EUTRA link 147 and WiFi link 148, or all downlink bearer traffic is transmitted via WiFi link 148. The traffic splitting ratio used by eNodeB 111 to split the downlink bearer traffic for UE 130 may be determined by eNodeB 111 (e.g., based on one or more of status information associated with the RAN portion of LTE network 110, status information associated with EUTRA interface 117 (e.g., load information), status information associated with WAP 120 (e.g., queue backpressure, load, or the like), or the like), provided to eNodeB 111 (e.g., by another element of cellular network 110, or the like), or the like, as well as various combinations thereof.

The UE 130 is configured to receive downlink bearer traffic from eNodeB 111. The manner in which UE 130 receives the downlink bearer traffic depends on the manner in which the downlink bearer traffic is sent from eNodeB (e.g., receiving all downlink bearer traffic via EUTRA link 147, receiving respective portions of the downlink bearer traffic via EUTRA link 147 and WiFi link 148, or receiving all downlink bearer traffic via WiFi link 148). The UE 130 is configured to combine downlink bearer traffic when the downlink bearer traffic is received via both EUTRA link 147 and WiFi link 148, such that the downlink bearer traffic is reassembled into the form it took prior to being split by eNodeB 111. It will be appreciated that the manner in which UE 130 recombines the downlink bearer traffic may depend on the manner in which eNodeB 111 split the downlink bearer traffic (e.g., where packets of a single packet flow are split, the packets may be recombined to be in the order in which the packets were arranged prior to being split; where the packets of multiple packet flows are split, the packets may need to be organized based on packet flows and the sets of packets of the packet flows may be recombined to be in the order in which the packets of the packet flows were arranged prior to being split; or the like). The UE 130 may be configured to perform processing or handling of downlink bearer traffic at UE 130 (e.g., storing the downlink bearer traffic in memory 132, propagating the downlink bearer traffic toward one or more user interfaces of UE 130 for presentation to one or more users, or the like, as well as various combinations thereof).

For uplink bearer traffic from UE 130, both UE 130 and eNodeB 111 are configured to support propagation of the uplink bearer traffic via EUTRA link 147 and WiFi link 148. It is noted that transmission of uplink bearer traffic from UE 130 via EUTRA link 147 might have the effect of offloading at least some uplink bearer traffic from WiFi link 148 (e.g., uplink bearer traffic that otherwise would have been sent via WiFi link 148), which may provide various benefits for transmission of both uplink bearer traffic and downlink bearer traffic within communication system 100.

The UE 130 may be configured to selectively split uplink bearer traffic between EUTRA link 147 and WiFi link 148. The splitting of uplink bearer traffic between EUTRA link 147 and WiFi link 148 may be based on an observation that the benefits of using EUTRA link 147 for transmission of uplink bearer traffic from UE 130 tend to increase as the load on WAP 120 increases (as a result of the expected increase in contention for uplink access that would otherwise result if uplink bearer traffic were transmitted via WiFi link 148), such that it may not be necessary or desirable to eliminate transmission of uplink bearer traffic from UE 130 via WiFi link 148 when WAP 120 has relatively light loading. The selective splitting of uplink bearer traffic between EUTRA link 147 and WiFi link 148 includes selectively splitting uplink bearer traffic between transmission via EUTRA interface 137 (and, thus, EUTRA link 147) and transmission via WiFi interface 138 (and, thus, WiFi link 148). The UE 130 may split the uplink bearer traffic on a per-flow basis (e.g., splitting traffic of a given application flow such that a first portion of the packets of the packet flow are sent via EUTRA link 147 and a second portion of the packets of the packet flow are sent via WiFi link 148), independent of applications flow (e.g., a first portion of the uplink bearer traffic to be sent via eNodeB 111 is sent via EUTRA link 147 and a second portion of the uplink bearer traffic to be sent via eNodeB is sent via WiFi link 148), or the like. The UE 130 may split the uplink bearer traffic between EUTRA link 147 and WiFi link 148 based on a traffic splitting ratio for UE 130. The traffic splitting ratio may be set such that all uplink bearer traffic is transmitted via EUTRA link 147, respective portions of uplink bearer traffic are distributed across EUTRA link 147 and WiFi link 148, or all uplink bearer traffic is transmitted via WiFi link 148. The traffic splitting ratio used by UE 130 to split the uplink bearer traffic may be determined by any suitable element based on any suitable information. The traffic splitting ratio for uplink bearer traffic sent from UE 130 may be determined by UE 130 (e.g., based on measurements at UE 130, based on processing of information provided to UE 130 by eNodeB 111 or WAP 120, or the like), determined within LTE network 110 and signaled to UE 130, or the like. The traffic splitting ratio for uplink bearer traffic sent from UE 130 may be determined based on one or more of WLAN load (e.g., measured by UE 130 from the beacon, reported to UE 130 via Access Network Discovery and Selection Function (ANDSF), or the like), RAN load (e.g., reported to UE 130 via broadcast or unicast signaling from the RAN, reported to UE 130 via ANDSF, or the like), or the like. The selective splitting of uplink bearer traffic at UE 130 may be based on at least one of status information associated with the WLAN access point, status information associated with the cellular network access point, an intensity of uplink bearer traffic at the user device (e.g., a number of uplink bearer traffic flows, bandwidth requirements of uplink bearer traffic flows, or the like, as well as various combinations thereof), a request by UE 130 to LTE network 110 (e.g., RAN portion of LTE network 110) and associated authorization by LTE network 110, or the like, as well as various combinations thereof.

The eNodeB 111 is configured to receive uplink bearer traffic from UE 130. The manner in which eNodeB 111 receives the uplink bearer traffic depends on the manner in which the uplink bearer traffic is sent from UE 130 (e.g., receiving all uplink bearer traffic via EUTRA link 147, receiving respective portions of the uplink bearer traffic via EUTRA link 147 and WiFi link 148 (via the data link 146 between WAP 120 and eNodeB 111), or receiving all uplink bearer traffic via WiFi link 148 (again, via the data link 146 between WAP 120 and eNodeB 111). The eNodeB 111 is configured to combine uplink bearer traffic when the uplink bearer traffic is received via both EUTRA link 147 and WiFi link 148, such that the uplink bearer traffic is reassembled into the form it took prior to being split by eNodeB 111. It will be appreciated that the manner in which eNodeB 111 recombines the uplink bearer traffic may depend on the manner in which UE 130 split the uplink bearer traffic The eNodeB 111 may be configured to propagate the uplink bearer traffic upstream within the LTE network 110.

In at least some embodiments, in which EUTRA link 147 is based on a system supporting tuning of the forward link/reverse link resource ratio (e.g., a TD-LTE system), in order to accommodate the additional traffic on the EUTRA link 147 due to transmission of uplink bearer traffic via the EUTRA link 147 rather than the WiFi link 148, EUTRA link 147 may be tuned to give a higher allocation of resources to the reverse link than might otherwise be used for the reverse link where no uplink bearer traffic intended for transmission via WiFi link 148 is transmitted via EUTRA link 147. The tuning of the EUTRA link 147 may be controlled by eNodeB 111 or any other suitable element of LTE network 110.

As discussed above, splitting of uplink bearer traffic of UE 130 between EUTRA link 147 and WiFi link 148 might have the effect of offloading at least some uplink bearer traffic from WiFi link 148 (e.g., uplink bearer traffic that otherwise would have been sent via WiFi link 148 and is now sent via EUTRA link 147), which may provide various benefits for transmission of both uplink bearer traffic and downlink bearer traffic within communication system 100.

With respect to transmission of uplink bearer traffic via EUTRA link 147, the transmission of uplink bearer traffic via EUTRA interface 137 rather than WiFi interface 138 has the effect of ensuring that the uplink transmissions via EUTRA interface 137 are scheduled and, thus, do not need to contend with any transmissions via the WiFi interface 138 (e.g., transmissions of other uplink bearer traffic which still may be transmitted via WiFi link 148, downlink bearer traffic transmitted from WAP 120 to UE 130 via WiFi link 148, or the like). It is noted that, where all uplink bearer traffic is transmitted via EUTRA link 147, rather than WiFi link 148, all uplink transmissions of uplink bearer traffic are completely scheduled and, thus, UE 130 does not contribute to contention for the WiFi link 148. It is further noted that, where all uplink bearer traffic is transmitted via EUTRA link 147, rather than WiFi link 148, the loss of availability of WiFi link 148 for transmission of uplink bearer traffic from UE 130 (which is actually relatively small given that, most of the time, WiFi link 148 would have been unavailable for transmission of uplink bearer traffic anyway due to collisions) is compensated for by the efficiency provided by characteristics of EUTRA link 147 (e.g., use of time and frequency division multiplexing of the uplink bearer traffic on EUTRA link 147).

With respect to transmission of downlink bearer traffic via WiFi link 148, transmission of uplink bearer traffic by UE 130 via EUTRA interface 137 rather than WiFi interface 138 has the effect of reducing the amount of (or even eliminating) the uplink bearer traffic that is transmitted by UE 130 on WiFi link 148, thereby reducing (or, again, even eliminating) contention for WiFi link 148 that is due to uplink bearer traffic being transmitted from UE 130. As a result, the throughput of WiFi link 148 may be increased due to increased availability of the WiFi link 148 for downlink transmissions because of the reduced contention for transmissions of uplink bearer traffic of UE 130 via WiFi link 148.

Further with respect to transmission of downlink bearer traffic via WiFi link 148, it is noted that multiple UEs may be associated with WAP 120. As such, even where transmission of uplink bearer traffic from UE 130 via WiFi link 148 is completely eliminated, there may still be one or more other UEs that are still using WiFi link 148 for transmission of uplink bearer traffic. However, it is also possible that each UE associated with WAP 120 may completely offload its uplink bearer traffic from WiFi link 120 to respective EUTRA links of the UEs. The offloading of all uplink bearer traffic of UEs associated with the WAP 120 ensures that there is no contention to resolve at WAP 120 and, thus, that WiFi interface 128 of WAP 120 (and, thus, WiFi link 148 of WAP 120) can operate as scheduled access for downlink bearer traffic only. The offloading of all uplink bearer traffic of UEs associated with the WAP 120 also ensures that downlink data rates can now be guaranteed, or at least deterministic, on WiFi link 148 since the WiFi channel use is fully under the control of the scheduler at WAP 120. Thus, as noted above, offloading of uplink bearer traffic at UEs associated with WAP 120 increases the downlink throughput of WAP 120. For example, the throughput of WiFi link 148 may be increased from as low as about 40% (where 60% of the WiFi channel is unavailable due to collisions and contention resolution procedures) to about 80% (where the approximately 20% of unavailability is only due to CSMA protocol overhead such as DIFS, SIFS, ACK, and CW) since it is now expected that WAP 120 will always or nearly always find the WiFi link 148 available for transmission of downlink bearer traffic received from eNodeB 111).

Figure 2A:
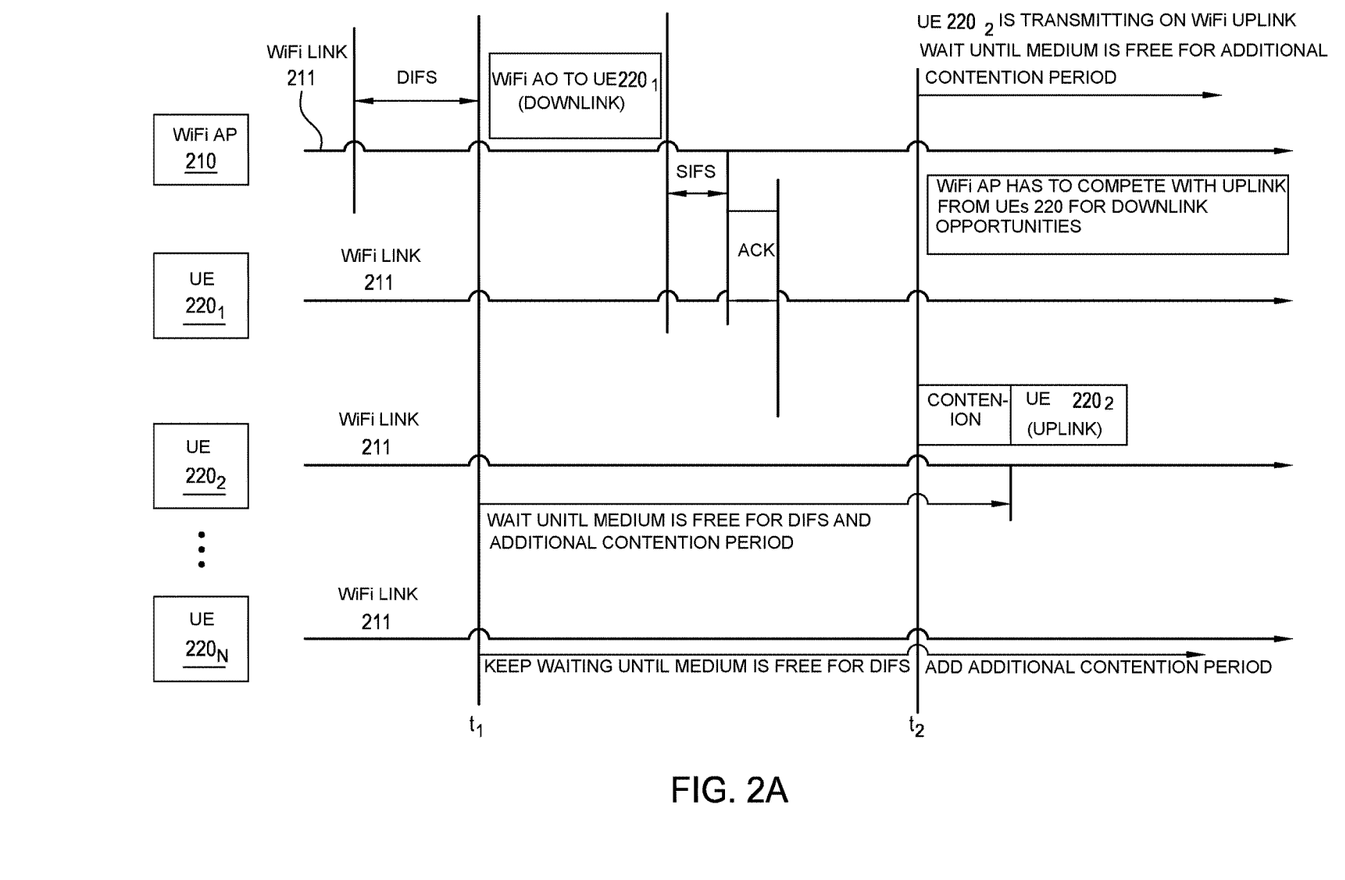
FIGS. 2A and 2B depict transmissions illustrating increased downlink throughput achieved via a wireless local area network due to routing of uplink bearer traffic via a cellular network.
Figure 2B:
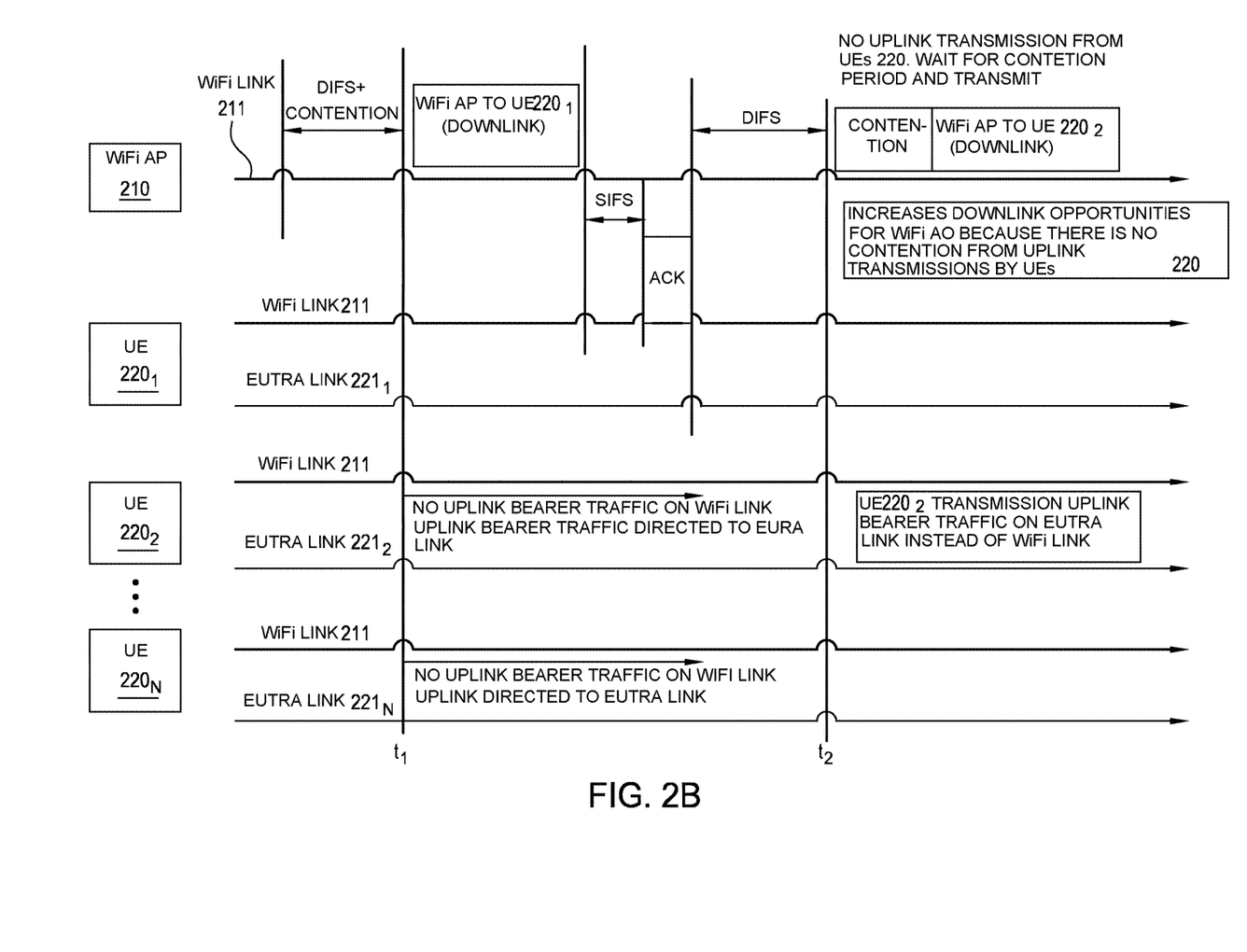

The improvement in downlink throughput of WiFi link 148 due to offloading of uplink may be seen by way of reference to FIGS. 2A and 2B. FIGS. 2A and 2B depict (1) transmissions of a WiFi AP 210 supporting a WiFi link 211 and (2) transmissions of a plurality of UEs $220_1$-$220_N$ (collectively, UEs 220) supporting a respective plurality of EUTRA links $221_1$-$221_N$ (collectively, EUTRA links 221) and having access to WiFi link 211. FIG. 2A depicts a situation in which not all of the uplink bearer traffic of the UEs 220 is transmitted via the respective EUTRA links 221 (and, thus, some or all of the UEs 220 are vying with WiFi AP 210 for access to WiFi link 211), whereas FIG. 2B depicts a situation in which all of the uplink bearer traffic of the UEs 220 is transmitted via the respective EUTRA links 221 (and, thus, none of the UEs 220 are vying with WiFi AP 210 for access to WiFi link 211). As depicted in FIG. 2A, at time $t_2$ the WiFi AP 210 is unable to transmit downlink data to any of the UEs 220, because UE $220_2$ was granted access to the WiFi link 211 for transmission of uplink bearer traffic from UE $220_2$ to WiFi AP 210. By contrast, as depicted in FIG. 2B, at time $t_2$ the WiFi AP 210 is able to transmit downlink data to UE $220_2$ and, at the same time, UE $220_2$ is able to transmit uplink bearer traffic via EUTRA link $221_2$. It is noted that this transmission of downlink data from WiFi AP 210 to UE $220_2$ at the time starting at time t2 in the arrangement of FIG. 2B represents an additional transmission of downlink data not possible within the arrangement of FIG. 2A.

It is noted that the splitting of uplink bearer traffic between EUTRA link 147 and WiFi link 148 may be based on an observation that the benefits of using EUTRA link 147 for transmission of uplink bearer traffic from UE 130 tend to increase as the load on WAP 120 increases (as a result of the expected increase in contention for uplink access that would otherwise result if uplink bearer traffic were transmitted via WiFi link 148), such that it may not be necessary or desirable to eliminate transmission of uplink bearer traffic from UE 130 via WiFi link 148 when WAP 120 has relatively light loading.

In at least some embodiments, one or more WiFi parameters of WAP 120 may be adjusted based on changes in the amount of uplink bearer traffic transmitted by UE 130 via WiFi link 148. For example, WAP 120 may be configured to adjust the CW parameters of WAP 120. The maximum and minimum CW parameters of WAP 120 determine the time that WAP 120 and UEs associated with WAP 120 (illustratively, UE 130 and possibly one or more other UEs which are omitted for purposes of clarity) have to wait (i.e., the back-off period) after sensing that WiFi link 148 is busy. Thus, the CW parameters of WPA 120 can be decreased as the amount of uplink bearer traffic directed to EUTRA link 147 increases and, conversely, the CW parameters can be increased as the amount of uplink bearer traffic directed to EUTRA link 147 decreases). Thus, WAP 120 may be configured to use smaller values of the CW parameters than would otherwise be possible if uplink bearer traffic was sent via the WiFi link 148 (and, in at least some embodiments, to use a minimum value of the CW parameters).

In at least some embodiments, eNodeB 111 may be configured to control establishment and termination of the WiFi link for UE 130 (e.g., WiFi link 148 established with WAP 120 or any other suitable WiFi link associated with any other suitable WAP). In at least some embodiments, eNodeB 111 may be configured to control establishment and termination of the WiFi link for UE 130 based on UE-based measurement reports of WiFi link parameters associated with WAPs available for use by UE 130.

The eNodeB 111 may be configured to control sending by UE 130 of the UE-based measurement reports of WiFi link parameters associated with WAPs available for use by UE 130. The eNodeB 111 may provide signaling to UE 130 to (1) inform UE 130 regarding WAPs for which UE 130 should collect measurements of WiFi link parameters for use in providing UE-based measurement reports (e.g., by WAP identifiers of the WAPs), (2) provide UE 130 with an indication as to which WiFi link parameters are to be provided in the UE-based measurement reports provided from UE 130 to eNodeB 111, and (3) provide UE 130 with measurement control parameters indicative as to when UE-based measurement reports of WiFi link parameters are to be sent by UE 130 to eNodeB 111. This information (or at least a portion of the information) may be sent from eNodeB 111 to UE 130 using broadcast signaling or dedicated signaling. This information (or at least a portion of the information) may be sent from eNodeB 111 to UE 130 via RRC signaling. The WAP identifiers may include any suitable identifiers (e.g., (Basic Service Set Identification (BSSID), SSID, Homogeneous Extended Service Set Identifier (HESSID), or the like). The signaling of WAP identifiers may be performed as defined in Section 6.1.3.1-2 of 3GPP TR 37.834. The WiFi link parameters which may be included in a UE-based measurement report of UE 130 for WAP 120 may be parameters as defined in Section 6.1.3.1-3 of 3GPP TR 37.834. The measurement control parameters may be configured on UE 130 using RRC signaling. The measurement control parameters may be parameters for measurement control as defined in Section 6.1.3.1-1 of 3GPP TR 37.834. The measurement control parameters may be event-based triggers for controlling sending of UE-based measurement reports of WLAN link parameters by UE 130 to eNodeB 111.

The UE 130 may be configured to send a UE-based measurement report when one of the measurement control parameters is satisfied (e.g., when one of the defined events is triggered). The eNodeB 111 may be configured to receive a UE-based measurement report and handle a WiFi link for UE 130 based on the UE-based measurement report. The handling of a WiFi link 148 for UE 130 may include establishment of a WiFi link (e.g., establishment of WiFi link 148 as a new WiFi link for UE 130), transfer of WiFi link (e.g., transfer of WiFi link 148 such that WiFi link 148 moves from an existing WAP to a new WAP), termination of a WiFi link (e.g., termination of WiFi link 148), or the like. The eNodeB 111, based on a determination that a WiFi link is to be established for UE 130, selects a WAP (e.g., WAP 120 or any other suitable WAP) for UE 130 and then directs UE 130 (e.g., via RRC signaling or in any other suitable manner) to associate with the selected WAP. The UE 130, following establishment of the WiFi link with the selected WAP, reports the association to eNodeB 111 so that eNodeB 111 knows the WAP to which downlink bearer traffic of UE 130 is to be directed). The UE 111 may be configured to report link quality information for the WiFi link after establishment of the WiFi link for UE 130 (e.g., using the same measurement control parameters previously provided to UE 130 before establishment of the WiFi link, using new measurement control parameters provided to UE 130 after establishment of the WiFi link, or the like). The UE 130 also may be configured to provide UE-based measurement reports for one or more other WAPs (e.g., one or more other WAPs in the vicinity of UE 130) after establishment of the WiFi link. The configuration of UE 130 to provide UE-based measurement reports for the one or more other WAPs may be based on configuration information received by UE 130 before establishment of the WiFi link (as discussed above), configuration information received by UE 130 after establishment of the WLAN link, or the like. The eNodeB 111 may be configured to analyze the status of the WiFi link (and, optionally, the status of one or more other WAPs based on the UE-based measurement reports for the one or more other WAPs) in order to determine whether to maintain the WiFi link, switch UE 130 from the WiFi link to a new WiFi link (e.g., with a different WAP), or terminate the WiFi link.

It will be appreciated that, although primarily depicted and described with respect to embodiments in which handling of the WiFi link for UE 130 is performed by eNodeB 111, in at least some embodiments handling of the WiFi link (or at least portions of handling of the WiFi link, such as controlling providing of WLAN link parameters or the like) for UE 130 may be performed by one or more other elements of cellular network 110 (e.g., one or more other elements of the RAN, the ANDSF, or the like).

Figure 3:
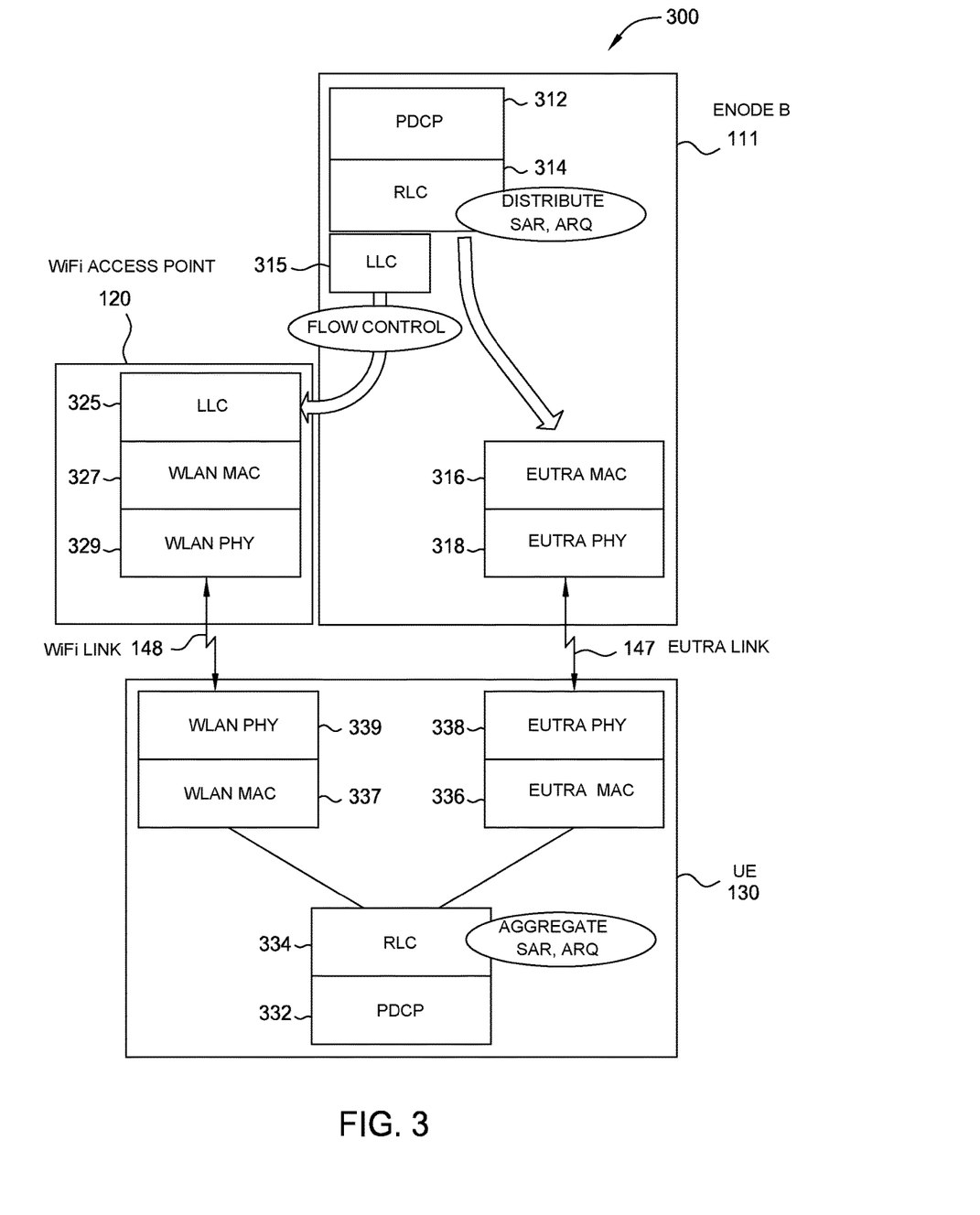
FIG. 3 depicts exemplary protocol stacks for downlink transmissions within the communication system of FIG. 1.

In at least some embodiments, distribution of downlink bearer traffic of UE 130 between EUTRA link 147 and WiFi link 148 is performed at the Radio Link Control (RLC) layer. An exemplary embodiment is illustrated in FIG. 3, which depicts exemplary protocol stacks for transmission of downlink bearer traffic within communication system 100 of FIG. 1. As depicted in FIG. 3, eNodeB 111, WAP 120, and UE 130 each support respective protocol stacks (although it is noted that only relevant portions of the protocol stacks are depicted in FIG. 3). The protocol stack of eNodeB 111 includes a Packet Data Convergence Protocol (PDCP) layer 312, an RLC layer 314, a Logical Link Control (LLC) layer 315, an EUTRA Media Access Control (MAC) layer 316, and an EUTRA Physical (PHY) layer 318. The WAP 120 includes an LLC layer 225, a WLAN MAC layer 327, and a WLAN PHY layer 329. The UE 130 includes a PDCP layer 332, an RLC layer 334, an EUTRA MAC layer 336 and an EUTRA PHY layer 338, and a WLAN MAC layer 337 and a WLAN PHY layer 339.

The RLC layer 314 at eNodeB 111 may interface with the EUTRA MAC layer 316 at eNodeB 111 based on currently defined protocols and primitives. The RLC layer 314 at eNodeB 111, in addition to performing existing functions (e.g., Segmentation and Reassembly (SAR), Automatic Repeat Request (ARQ), or the like), may be configured to perform an additional function of distributing downlink bearer traffic (e.g., splitting of downlink bearer traffic between LLC layer 315 supporting transmissions to WAP 120 and EUTRA MAC layer 318 supporting transmissions to UE 130 via EUTRA link 147).

The RLC layer 314 at eNodeB 111 may interface with WLAN MAC 327 at WAP 120 via the LLC protocol (e.g., 802.2-based LLC protocol), which is running on both eNodeB 111 (illustratively, LLC layer 315) and WAP 120 (illustratively, LLC layer 325). As discussed above, eNodeB 111 and WAP 120 may be communicatively connected via any suitable communication network (e.g., Ethernet or any other suitable type of communication network). The LLC protocol may operate in unacknowledged, connectionless mode, but would need flow control. The LLC layer 315 of eNodeB 111 may provide the RLC layer 314 of eNodeB 111 with status information (e.g., information indicative of one or more of queue backpressure at the WAP, congestion at the WAP, and the like) adapted for use by the RLC layer in controlling splitting of the downlink bearer traffic between the EUTRA link and the WLAN link.

The RLC layer 314 at eNodeB 111 is configured to perform the RLC ARQ mechanism. In at least some embodiments, the RLC ARQ mechanism, which provides an aggregate view of the uplink packets received via both the EUTRA link 147 and the WLAN link 148, may be handled on the EUTRA reverse link only such that there is no need for exchange of any RLC ARQ messages from the UE 130 to the WAP 120 via WLAN link 148.

The WLAN MAC layer 337 of the UE 130 and the WLAN MAC layer 227 of WAP 120 are configured to perform WLAN MAC layer ARQ mechanism for portions of the downlink bearer traffic received by UE 130 via the WiFi link 148.

It will be appreciated that, although primarily depicted and described with respect to use of specific protocols to support communication of downlink bearer traffic from eNodeB 111 to UE 130 and communication of uplink bearer traffic from UE 130 to eNodeB 110, communication of downlink bearer traffic and uplink bearer traffic for UE 130 may be performed using any other suitable protocols.

Figure 4:
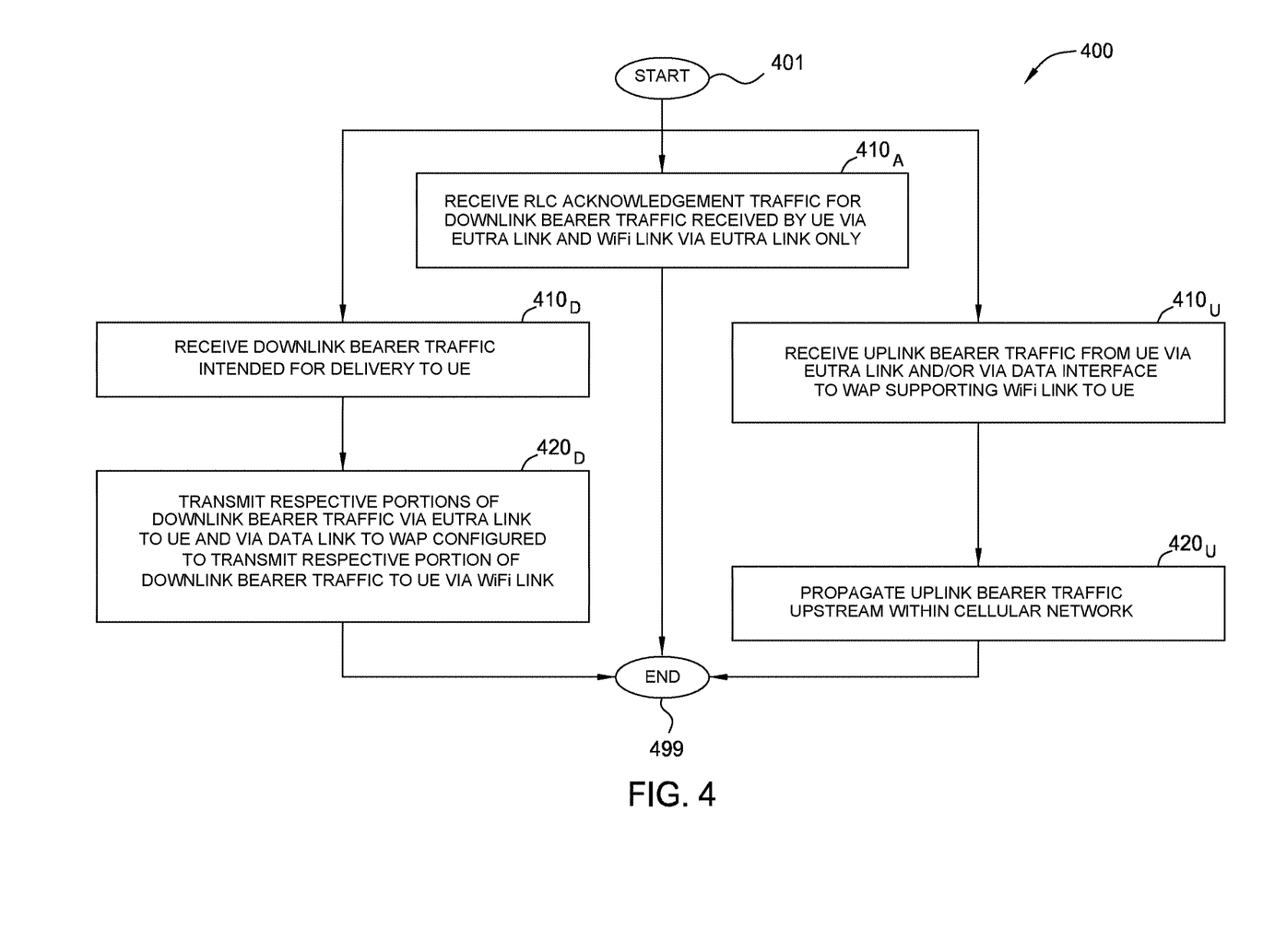
FIG. 4 depicts one embodiment of a method for use by an eNodeB of a cellular network to exchange traffic with a User Equipment (UE)

FIG. 4 depicts one embodiment of a method for use by an eNodeB of a cellular network to exchange traffic with a UE. It will be appreciated that, although primarily depicted and described as being performed in a specific order relative to each other, at least a portion of the steps of method 400 may be performed in a different order than depicted in FIG. 4. At step 401, method 400 begins and proceeds into one of three branches for handling: downlink bearer traffic to the UE (steps $410_D$ and $420_D$), RLC acknowledgment traffic associated with the downlink bearer traffic (step $410_A$), or uplink bearer traffic from the UE (steps $410_U$ and $420_U$), respectively. For downlink bearer traffic, the eNodeB (1) receives (step $410_D$), downlink bearer traffic intended for delivery to the UE, which may include downlink bearer traffic received from upstream within the cellular network or RLC retransmission packets and (2) propagates ($420_D$) respective portions of the downlink bearer traffic via an EUTRA link to the UE and via a data link to a WAP that is configured to transmit that portion of the downlink bearer traffic to the UE via a WiFi interface. For RCL acknowledgment traffic associated with the downlink bearer traffic, for each downlink bearer packet received by the UE via the EUTRA link and the WiFi link, the eNodeB receives (step $410_A$) an associated RLC ACK/NAK via the EUTRA link. For uplink bearer traffic, the eNodeB receives (step $410_U$) uplink bearer traffic from the UE via the EUTRA link and/or via the data interface to WAP supporting the WiFi link to the UE, and propagates ($420_U$) the uplink bearer traffic upstream within the cellular network. From steps $420_D$, $410_A$, and $420_U$, method 400 proceeds to step 499, where method 400 ends. It will be appreciated that, although depicted and described as ending (for purposes of clarity), method 400 may continue to operate to perform any of the various steps of method 400 as needed (e.g., as traffic is received, as traffic becomes available for transmission, or the like).

Figure 5:
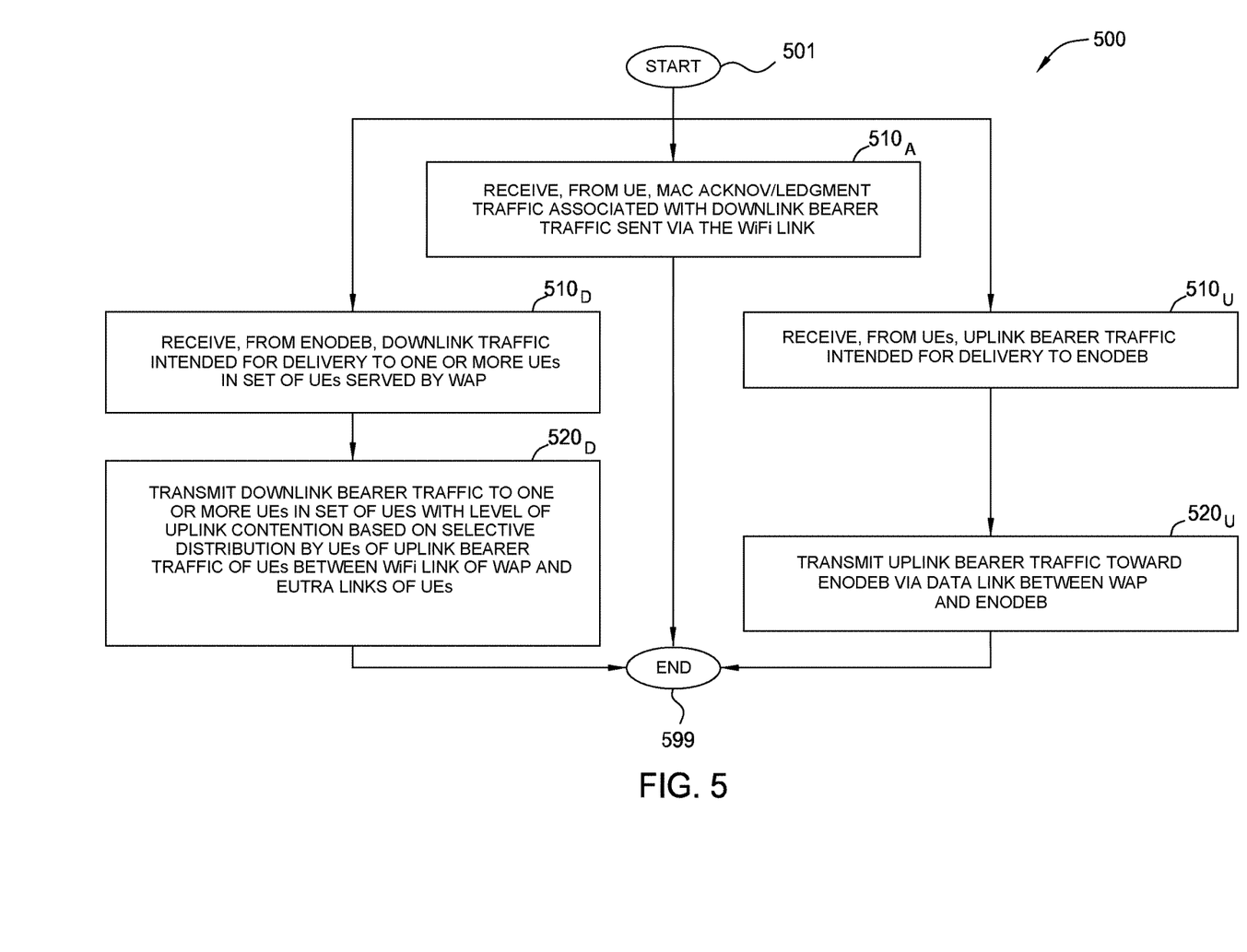
FIG. 5 depicts one embodiment of a method for use by a WiFi Access Point (WAP) to support communications for a UE.

FIG. 5 depicts one embodiment of a method for use by a WAP to support communications for a set of UEs. It will be appreciated that, although primarily depicted and described as being performed in a specific order relative to each other, at least a portion of the steps of method 500 may be performed in a different order than depicted in FIG. 5. At step 501, method 500 begins and proceeds into one of three branches for handling: downlink bearer traffic to the UEs (steps $510_D$ and $520_D$), MAC acknowledgment traffic associated with the downlink bearer traffic (step $510_A$), or uplink bearer traffic from the UEs (steps $510_U$ and $520_U$), respectively. For downlink bearer traffic, the WAP (1) receives (step $510_D$), from eNodeB, downlink bearer traffic intended for delivery to one or more UEs in the set of UEs, and (2) transmits (step $520_D$) the downlink bearer traffic to the one or more UEs in the set of UEs with a level of uplink contention that is based at least in part on selective distribution of upstream bearer traffic of the UEs between the WiFi link of the WAP and EUTRA links of the UEs. For MAC acknowledgment traffic associated with the downlink bearer traffic sent via the WiFi link, for each downlink bearer packet received by the UE via the WiFi link, the WAP receives (step $510_A$) from the UE an associated MAC ACK via the WiFi link. For uplink bearer traffic, the WAP (1) receives (step $510_U$), via the WiFi link, uplink bearer traffic from one or more UEs via the WiFi link and (2) transmits (step $520_U$) the uplink bearer traffic toward the eNodeB via a data link between the WAP and the eNodeB. It is noted that, in cases in which all of the UEs served by the WiFi link of the WAP have selectively distributed all of their uplink bearer traffic to their EUTRA links, respectively, the WAP will not receive uplink bearer traffic from the UEs (and, thus, as discussed herein, contention for the WiFi link of the WAP will be reduced, thereby improving throughput for delivery of downstream bearer traffic from the WAP in steps $510_D$ and $520_D$). From steps $520_D$, $510_A$, and $520_U$, method 500 proceeds to step 599, where method 500 ends. It is noted that, although omitted from FIG. 5 for purposes of clarity, the downlink traffic transmitted at step 520D also may include packets that need to be retransmitted as indicated by WiFi MAC ARQ procedures on the WAP. It will be appreciated that, although depicted and described as ending (for purposes of clarity), method 500 may continue to operate to perform any of the various steps of method 500 as needed (e.g., as traffic is received, as traffic becomes available for transmission, or the like).

Figure 6:
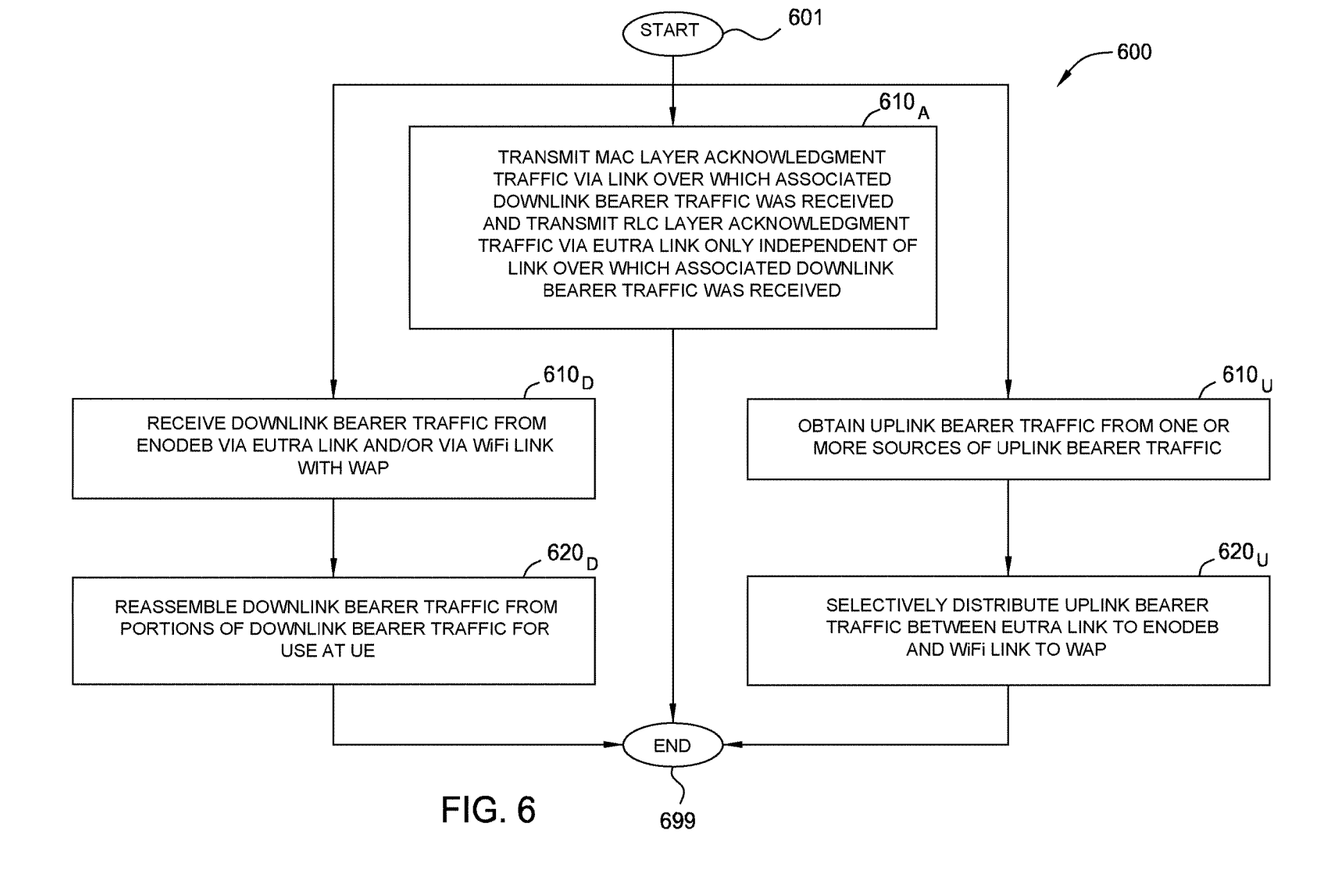
FIG. 6 depicts one embodiment of a method for use by a UE to exchange traffic with an eNodeB of a cellular network.

FIG. 6 depicts one embodiment of a method for use by a UE to exchange traffic with an eNodeB of a cellular network. It will be appreciated that, although primarily depicted and described as being performed in a specific order relative to each other, at least a portion of the steps of method 600 may be performed in a different order than depicted in FIG. 6. At step 601, method 600 begins and proceeds into one of three branches for handling: downlink bearer traffic to the UE (steps $610_D$ and $620_D$), acknowledgment traffic associated with the downlink bearer traffic (step $610_A$), or uplink bearer traffic from the UE (steps $610_U$ and $620_U$), respectively. For downlink bearer traffic, the UE (1) receives (step $610_D$) respective portions of downlink bearer traffic via an EUTRA link to the eNodeB and/or via a WiFi link to a WAP that is configured to receive that portion of the downlink bearer traffic from the eNodeB, and (2) reassembles ($620_D$) the downlink bearer traffic, from the portions of the downlink bearer traffic, for use at the UE (e.g., for storage at the UE, for presentation via one or more user interfaces of the UE, or the like). For acknowledgment traffic associated with the downlink bearer traffic received by the UE, the UE is configured to transmit (step $610_A$)

MAC acknowledgment traffic and RLC acknowledgment traffic. For each downlink bearer packet received by the UE, the UE transmits an associated MAC ARQ packet via the link on which the associated downlink bearer packet was received. For the downlink bearer traffic received via EUTRA link, the MAC level ARQ is transmitted from the UE to the eNodeB via the EUTRA link using existing EUTRA procedures. For the downlink bearer traffic received via the WiFi link, the MAC level ARQ is transmitted from the UE (for delivery to the eNodeB via the WAP) via the WiFi uplink using existing WiFi procedures based on the SIFS interval that do not lead to contention with the downlink bearer traffic sent by the WAP. For each downlink bearer packet received by the UE via the EUTRA link and the WiFi link, the UE transmits an associated RLC ACK/NAK via the EUTRA link only. For uplink bearer traffic, the UE receives (step $610_U$) the uplink bearer traffic from one or more sources of uplink bearer traffic on the UE (e.g., one or more application clients, RLC retransmission packets, or the like), and selectively distributes the uplink bearer traffic between the EUTRA link and the WiFi link (which, as discussed above, may be based on various parameters and information). From steps $620_D$, $620_A$, and $620_U$, method 600 proceeds to step 699, where method 600 ends. It will be appreciated that, although depicted and described as ending (for purposes of clarity), method 600 may continue to operate to perform any of the various steps of method 600 as needed (e.g., as traffic is received, as traffic becomes available for transmission, or the like).

In at least some embodiments an eNodeB-to-eNodeB handover from a source eNodeB to a target eNodeB may be supported for a UE being served by both an EUTRA link and a WiFi link. The WiFi link may be transferred from the source eNodeB to the target eNodeB, or the WiFi link with the source eNodeB may be terminated and a new WiFi link with the target eNodeB may be established. In at least some embodiments, a determination as to whether the existing WiFi link should be transferred from the source eNodeB to the target eNodeB or a new WiFi link should be established with the target eNodeB may be performed based on one or more of cellular measurement information, WLAN measurement information, or the like.

In at least some embodiments a WAP-to-WAP handover from a source WAP to a target WAP may be supported for a UE being served by both an EUTRA link and a WiFi link with the source WAP. If the handover is within the same Extended Service Set (ESS), then the handover may be transparent to the eNodeB providing the EUTRA link (e.g., transparency may be provided by the Distribution Service (DS)). If the handover is not transparent to the eNodeB, the eNodeB is updated with the WLAN information for the target WAP such that the eNodeB may support a WiFi link to the target WAP for the UE.

In at least some embodiments, a UE that is currently associated with a WAP, upon detection of an LTE system, may establish a connection with the LTE system (e.g., an EUTRA link with an eNodeB of the LTE system) and then offload at least a portion (and, in some cases, all) uplink bearer traffic from the WAP to the LTE system. This will reduce contention on the WAP (thereby improving the downlink throughput for delivery of the downlink bearer traffic to the UE) while enabling the uplink bearer traffic of the UE to be transmitted based on scheduled access available on the reverse link of the LTE system. In at least some embodiments, at least a portion of the downlink bearer traffic of the UE also may be offloaded from the WAP to the LTE system.

It will be appreciated that, although primarily depicted and described with respect to one user (illustratively, UE 130), embodiments of the cellular-WLAN integration capability may be provided for some or all of the users associated with a given eNodeB.

It will be appreciated that, although primarily depicted and described with respect to embodiments of the cellular-WLAN integration capability in which a specific type of cellular network (illustratively, an LTE network) is integrated with a specific type of local wireless (non-cellular) technology (illustratively, WiFi), embodiments of the cellular-WLAN integration capability may be used to integrate other types of cellular networks (e.g., UMTS, GPRS, or the like) or other types of local wireless technologies. Accordingly, references herein to LTE-specific elements may be read more generally and, similarly, references herein to WiFi-specific elements may be read more generally. For example, references herein to LTE network, eNodeB, EUTRA interface/link, and UE may be read more generally as cellular network, cellular access element/point/node, cellular interface/link, and user device/terminal, respectively. Similarly, references herein to WiFi access point may be read more generally as WLAN access point or local wireless access point.

Various embodiments of the cellular-WLAN integration capability support integration in a manner tending to provide various improvements in the resulting system. Various embodiments of the cellular-WLAN integration capability support integration in a manner so as to increase (and in at least some cases maximize) the spectral efficiency of the system and increase the deliverable throughput of the system. Various embodiments of the cellular-WLAN integration capability support integration such that the users of the system are allocated resources in a manner that improves their quality of experience. Various other improvements and advantages of various embodiments of the cellular-WLAN integration capability are contemplated and will be understood in view of the teachings herein.

It will be appreciated that, although primarily depicted and described herein within the context of embodiments in which integration of cellular and WLAN networks is made via a communication path between the cellular access node (e.g., eNodeB) of the cellular network and the WLAN access point (e.g., WiFi AP) of the WLAN network, various embodiments depicted and described herein also may be used when the cellular and WLAN networks are not integrated via a communication path between the cellular access node of the cellular network and the WLAN access point (e.g., WiFi AP) of the WLAN network. In at least some embodiment, for example, a UE communicating via a WLAN link to a WAP, based on a determination that a cellular link is available, may selectively switch some or all of its uplink bearer traffic from the WLAN link to the cellular link. It is noted that this has the effect improving the performance of the WiFi link (due to the resultant reduction in contention for the WiFi link) and providing a better uplink experience for the user of the UE since the uplink bearer traffic is now transmitted over a scheduled cellular link rather than a contention-based WLAN link.

It will be appreciated that, although primarily depicted and described with respect to embodiments in which a specific type of cellular technology is used, various embodiments depicted and described herein may be used with other types of cellular technology or other types of wireless technologies (e.g., wireless technologies providing wide area coverage, wireless technologies providing scheduled, contentionless access to wireless resources, or the like, as well as various combinations thereof).

It will be appreciated that, although primarily depicted and described with respect to embodiments in which a WiFi technology is used, various embodiments depicted and described herein may be used with other types of wireless technologies supporting polite access mechanisms for access to a common wireless medium.

Figure 7:
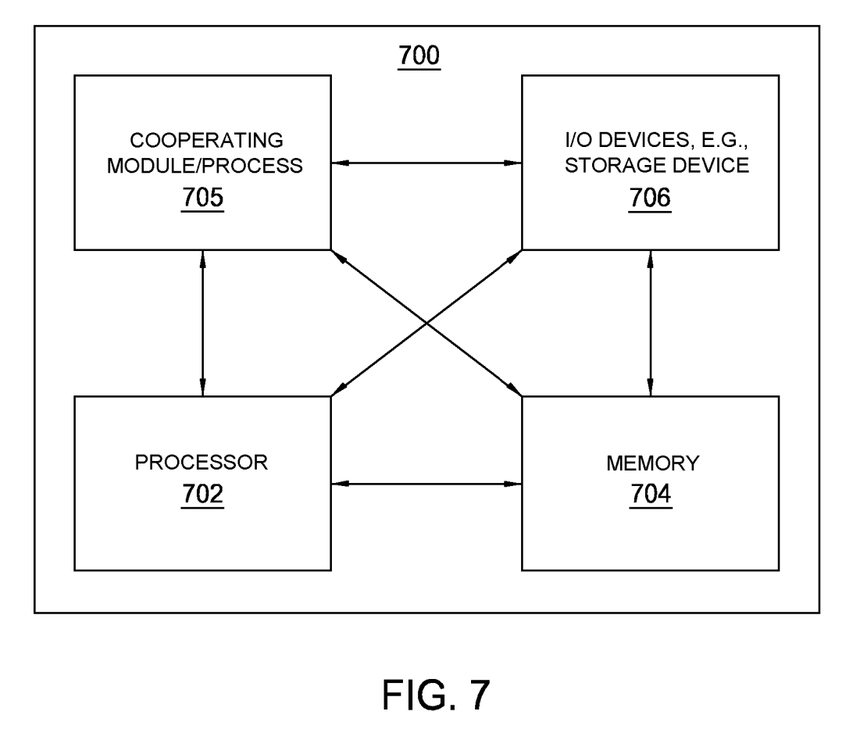
FIG. 7 depicts a high-level block diagram of a computer suitable for use in performing functions presented herein.

FIG. 7 depicts a high-level block diagram of a computer suitable for use in performing functions described herein.

The computer 700 includes a processor 702 (e.g., a central processing unit (CPU) and/or other suitable processor(s)) and a memory 704 (e.g., random access memory (RAM), read only memory (ROM), or the like).

The computer 700 also may include a cooperating module/process 705. The cooperating process 705 can be loaded into memory 704 and executed by the processor 702 to implement functions as discussed herein and, thus, cooperating process 705 (including associated data structures) can be stored on a computer readable storage medium, e.g., RAM memory, magnetic drive, optical drive, disk, diskette, or the like.

The computer 700 also may include one or more input/output devices 506 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 700 depicted in FIG. 7 provides a general architecture and functionality suitable for implementing functional elements described herein and/or portions of functional elements described herein. For example, computer 700 provides a general architecture and functionality suitable for implementing one or more of eNodeB 111, a portion of eNodeB 111, WAP 120, a portion of WAP 120, UE 130, a portion of UE 130, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

Aspects of various embodiments are specified in the claims. Those and other aspects of various embodiments are specified in the following numbered clauses:

Clause 1. A user device, comprising:
an interface configured for communication via a cellular link;
an interface configured for communication via a contention-based wireless link; and
a processor configured to:
receive downlink bearer traffic via at least one of the interface configured for communication via the cellular link or the interface configured for communication via the contention-based wireless link; and
selectively distribute uplink bearer traffic between the interface configured for communication via the cellular link and the interface configured for communication via the contention-based wireless link.

Clause 2. The user device of Clause 1, wherein the processor is configured to:
combine downlink bearer traffic received via the interface configured for communication via the cellular link and the interface configured for communication via the contention-based wireless link.

Clause 3. The user device of Clause 1, wherein the processor is configured to selectively distribute uplink bearer traffic based on at least one of:
status information associated with the WLAN access point;
status information associated with the cellular network access point;
an intensity of uplink bearer traffic at the user device; or
a request by the user device and associated authorization by a radio access network with which the cellular network access point is associated.

Clause 4. The user device of Clause 1, wherein the processor is configured to:
distribute a first portion of the uplink bearer traffic to the interface configured for communication via the cellular link; and
distribute a second portion of the uplink bearer traffic to the interface configured for communication via the contention-based wireless link.

Clause 5. The user device of Clause 1, wherein the processor is configured to:
distribute all of the uplink bearer traffic to the interface configured for communication via the cellular link.

Clause 6. The user device of Clause 1, wherein the processor is configured to:
transmit Radio Link Control (RLC) layer acknowledgment traffic, corresponding to downlink bearer traffic received via the interface configured for communication via the cellular link and downlink bearer traffic received via the interface configured for communication via the contention-based wireless link, via the interface configured for communication via the cellular link only.

Clause 7. The user device of Clause 1, wherein the processor is configured to:
transmit Media Access Control (MAC) layer acknowledgment traffic, corresponding to downlink traffic received via the interface configured for communication via the cellular link, via the interface configured for communication via the cellular link only.

Clause 8. The user device of Clause 1, wherein the processor is configured to:
transmit MAC layer acknowledgment traffic, corresponding to downlink traffic received via the interface configured for communication via the contention-based wireless link, via the interface configured for communication via the contention-based wireless link only.

Clause 9. A cellular network access point, comprising:
an interface configured for cellular communication via a cellular link;
an interface configured for communication with a wireless local area network (WLAN) access point (WAP); and
a processor configured to:
receive downlink bearer traffic intended for delivery to an end user device and selectively distribute the downlink bearer traffic between the interface configured for cellular communication via the cellular link and the interface configured for communication with the WAP; and
receive uplink bearer traffic from the end user device via at least one of the interface configured for cellular communication via the cellular link and the interface configured for communication with the WAP.

Clause 10. The cellular network access point of Clause 9, wherein the processor is configured to:
distribute the downlink bearer traffic intended for delivery to the end user device based on at least one of status information associated with the WAP or status information associated with the cellular network access point.

Clause 11. The cellular network access point of Clause 9, wherein the processor is configured to:
distribute the downlink bearer traffic intended for delivery to the end user device only to the interface configured for communication with the WAP while receiving uplink bearer traffic from the end user device only via the interface configured for cellular communication via the cellular link.

Clause 12. The cellular network access point of Clause 9, wherein the processor is configured to:
tune at least one parameter of the cellular network access point based on an indication of a transfer of uplink bearer traffic of the end user device between the interface configured for communication with the WAP and the interface configured for cellular communication via the cellular link.

Clause 13. The cellular network access point of Clause 12, wherein the at least one parameter comprises a ratio between forward link resources of the cellular link and reverse link resources of the cellular link.

Clause 14. The cellular network access point of Clause 9, wherein the processor is configured to:
receive Radio Link Control (RLC) layer acknowledgment traffic, corresponding to downlink traffic transmitted via the interface configured for cellular communication via the cellular link and downlink bearer traffic transmitted via the interface configured for communication with the WAP, only via the interface configured for cellular communication via the cellular link.

Clause 15. A wireless local area network (WLAN) access point (WAP), comprising:
an interface configured for communication with a cellular network access point;
an interface configured for wireless communication with end user devices via a contention-based wireless link; and
a processor configured to:
receive, from the cellular network access point via the interface configured for communication with the cellular network access point, downlink bearer traffic intended for one or more of the end user devices; and
transmit the downlink bearer traffic toward the one or more end user devices via the interface configured for wireless communication with end user devices via the contention-based wireless link.

Clause 16. The WAP of Clause 15, wherein the processor is configured to:
receive uplink bearer traffic from one of the end user devices via the interface configured for wireless communication with end user devices via the contention-based wireless link; and
transmit the uplink bearer traffic toward the cellular network access point via the interface configured for communication with the cellular network access point.

Clause 17. The WAP of Clause 15, wherein the processor is configured to:
tune at least one parameter of the WAP based on an indication of a change in uplink transmissions by one or more of the end user devices via a cellular link associated with the cellular network access point.

Clause 18. The WAP of Clause 17, wherein the processor is configured to:
reduce at least one contention window (CW) parameter of the WAP based on an indication of an increase in a quantity of uplink transmissions by one or more of the end user devices via a cellular link associated with the cellular network access point.

Clause 19. The WAP of Clause 17, wherein the processor is configured to:
increase at least one contention window (CW) parameter of the WAP based on an indication of a decrease in a quantity of uplink transmissions by one or more of the end user devices via a cellular link associated with the cellular network access point.

Clause 20. The WAP of Clause 15, wherein the processor is configured to:
based on a determination that each of the end user devices associated with the WAP has transferred transmission of all of its respective uplink bearer traffic to respective cellular links with the cellular network access point:
perform scheduled transmission of the downlink bearer traffic via the interface configured for wireless communication with end user devices via the contention-based wireless link without contention from the end user devices.

It will be appreciated that, although various embodiments which incorporate the teachings presented herein have been shown and described in detail herein, those skilled in the art can readily devise many other varied embodiments that still incorporate these teachings.

What is claimed is:

1. A user device, comprising:
an interface configured for communication via a cellular link;
an interface configured for communication via a contention-based wireless link; and
a processor configured to:
receive downlink bearer traffic via at least one of the interface configured for communication via the cellular link or the interface configured for communication via the contention-based wireless link;
selectively distribute uplink bearer traffic between the interface configured for communication via the cellular link and the interface configured for communication via the contention-based wireless link; and
transmit Radio Link Control (RLC) layer acknowledgment traffic, corresponding to downlink bearer traffic received via the interface configured for communication via the cellular link and downlink bearer traffic received via the interface configured for communication via the contention-based wireless link, via the interface configured for communication via the cellular link only.

2. The user device of claim 1, wherein the processor is configured to:
combine downlink bearer traffic received via the interface configured for communication via the cellular link and the interface configured for communication via the contention-based wireless link.

3. The user device of claim 1, wherein the processor is configured to selectively distribute uplink bearer traffic based on at least one of:
status information associated with the WLAN access point;
status information associated with the cellular network access point;
an intensity of uplink bearer traffic at the user device; or
a request by the user device and associated authorization by a radio access network with which the cellular network access point is associated.

4. The user device of claim 1, wherein the processor is configured to:
distribute a first portion of the uplink bearer traffic to the interface configured for communication via the cellular link; and
distribute a second portion of the uplink bearer traffic to the interface configured for communication via the contention-based wireless link.

5. The user device of claim 1, wherein the processor is configured to:
distribute all of the uplink bearer traffic to the interface configured for communication via the cellular link.

6. The user device of claim 1, wherein the processor is configured to:
transmit Media Access Layer (MAC) layer acknowledgment traffic, corresponding to downlink traffic received via the interface configured for communication via the cellular link, via the interface configured for communication via the cellular link only; and
transmit MAC layer acknowledgement traffic, corresponding to downlink traffic received via the interface configured for communication via the contention-based wireless link, via the interface configured for communication via the contention-based wireless link only.

7. The user device of claim 1, wherein the processor is configured to:
transmit Media Access Control (MAC) layer acknowledgment traffic, corresponding to downlink traffic received via the interface configured for communication via the cellular link, via the interface configured for communication via the cellular link only.

8. The user device of claim 1, wherein the processor is configured to:
transmit MAC layer acknowledgment traffic, corresponding to downlink traffic received via the interface configured for communication via the contention-based wireless link, via the interface configured for communication via the contention-based wireless link only.

9. A cellular network access point, comprising:
an interface configured for cellular communication via a cellular link;
an interface configured for communication with a wireless local area network (WLAN) access point (WAP); and
a processor configured to:
receive downlink bearer traffic intended for delivery to an end user device and selectively distribute the downlink bearer traffic between the interface configured for communication via the cellular link and the interface configured for communication with the WAP;
receive uplink bearer traffic from the end user device via at least one of the interface configured for cellular communication via the cellular link and the interface configured for communication with the WAP; and
receive Radio Link Control (RLC) layer acknowledgment traffic, corresponding to downlink bearer traffic distributed to the interface configured for communication via the cellular link and downlink bearer traffic distributed to the interface configured for communication via the WAP, via the interface configured for communication via the cellular link only.

* * * * *